United States Patent
Wong et al.

(10) Patent No.: US 9,954,642 B2
(45) Date of Patent: Apr. 24, 2018

(54) SPATIAL CONTENTION IN DENSE WIRELESS NETWORK

(71) Applicant: Apple Inc., Cupertino, CA (US)

(72) Inventors: Chiu Ngok E. Wong, San Jose, CA (US); Christiaan A. Hartman, San Jose, CA (US); Guoqing Li, Cupertino, CA (US); Joonsuk Kim, Saratoga, CA (US); Su Khiong Yong, Palo Alto, CA (US); Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 124 days.

(21) Appl. No.: 15/082,505

(22) Filed: Mar. 28, 2016

(65) Prior Publication Data

US 2016/0309357 A1    Oct. 20, 2016

Related U.S. Application Data

(60) Provisional application No. 62/150,206, filed on Apr. 20, 2015.

(51) Int. Cl.
| | |
|---|---|
| *H04W 28/02* | (2009.01) |
| *H04L 1/00* | (2006.01) |
| *H04L 12/801* | (2013.01) |
| *H04W 74/08* | (2009.01) |
| *H04W 84/12* | (2009.01) |

(52) U.S. Cl.
CPC .......... *H04L 1/0026* (2013.01); *H04L 1/0003* (2013.01); *H04L 1/0009* (2013.01); *H04L 47/29* (2013.01); *H04W 28/0236* (2013.01); *H04W 74/0808* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 7,787,487 B2 * | 8/2010 | Liu | ..................... | H04W 74/085 370/448 |
| 2007/0214247 A1 * | 9/2007 | Yang | ....................... | H04L 12/66 709/223 |
| 2012/0252509 A1 * | 10/2012 | Wen | ..................... | H04B 7/2606 455/500 |
| 2014/0036691 A1 * | 2/2014 | Madan | .................. | H04W 24/10 370/242 |
| 2014/0286203 A1 * | 9/2014 | Jindal | .................. | H04J 11/0026 370/278 |
| 2015/0043478 A1 | 2/2015 | Mackenzie | | |
| 2015/0257174 A1 | 9/2015 | Liu | | |

* cited by examiner

Primary Examiner — Eunsook Choi
(74) Attorney, Agent, or Firm — Meyertons Hood Kivlin Kowert & Goetzel, P.C.; Jeffrey C. Hood; Brian E. Moore (57) ABSTRACT

In some embodiments, a first wireless device initializes a first threshold and sends a first frame transmission to a second wireless device. When the first wireless device determines that the first frame transmission was successful, it adjusts the first threshold to a second threshold that is greater than the first threshold. Additionally, when the first wireless device determines that the first frame transmission was not successful, the first wireless device adjusts the first threshold to a third threshold that is less than the first threshold. The thresholds can be associated with any measure, including carrier sensitivity and/or energy detection.

20 Claims, 6 Drawing Sheets

SPATIAL CONTENTION IN DENSE WIRELESS NETWORK

PRIORITY DATA

This application claims benefit of priority to U.S. Provisional Application Ser. No. 62/150,206, titled "Spatial Contention in Dense Wireless Network", filed Apr. 20, 2015 by Chiu Ngok E Wong, Christiaan A. Hartman, Guoqing Li, Joonsuk Kim, Su Khiong Yong, and Yong Liu, which is hereby incorporated by reference in its entirety as though fully and completely set forth herein.

FIELD

The present application relates to wireless communications, including techniques to maximize network capacity for wireless communications in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems, Wi-Fi mobile stations are able to co-locate with other Wi-Fi mobile stations and Wi-Fi access points. However, overcrowding of networks has led to decrease performance and higher packet error rates and improvements are desired.

SUMMARY

Embodiments described herein relate to systems and methods for increasing performance of co-located wireless devices.

Embodiments relate to a wireless station that includes one or more antennas, one or more radios, and one or more processors coupled to the radios. At least one radio is configured to perform Wi-Fi communications. The wireless station may perform voice and/or data communications, as well as the methods described herein.

In some embodiments, a first wireless device initializes a first threshold and sends a first frame transmission to a second wireless device. The first wireless device determines whether the first frame transmission was successful and in response to determining that the first frame transmission was successful, adjusts the first threshold to a second threshold that is greater than the first threshold. Additionally or alternatively, in response to determining that the first frame transmission was not successful, the first wireless device adjusts the first threshold to a third threshold that is less than the first threshold. The thresholds can be associated with any value or values, including carrier sensitivity and/or energy detection.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

AP: Access Point
BSS: Basic Service Set
BSSID: Basic Service Set Identifier
CCA: Clear Channel Assessment
DIFS: Distributed Interframe Space
DL: Downlink (from BS to UE)
EDCA: Enhanced Distributed Channel Access
LAN: Local Area Network
OBSS: Overlapping Basic Service Set
PCF: Point Coordination Function
PIFS: PCF Interframe Space
PLCP: PHY Layer Convergence Procedure
PPDU: PLCP Protocol Data Unit
RAT: Radio Access Technology
RX: Reception/Receive
TX: Transmission/Transmit
TXOP: Transmit Opportunity
UE: User Equipment
UL: Uplink (from UE to BS)
WLAN: Wireless LAN Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, Play Station Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (i.e., peer NAN devices). Note that the peer devices may be in a common (i.e., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked (i.e., in communication) via one or more NAN data links. Note that a peer wireless station may be a member of more than one NAN cluster.

NAN data cluster (NDC)—refers to a set of peer wireless stations in a common (i.e., same) NAN cluster that share a common base schedule (e.g., a NAN data cluster base schedule). In addition, peer wireless stations in a NAN data cluster may share at least one NAN data link with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (i.e., same) further availability slot(s) (or window(s)) as indicated by a NAN data cluster base schedule. In addition, each NAN data link may have its own NAN data link schedule and the NAN data link schedule may be a superset of a NAN data cluster base schedule.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1:
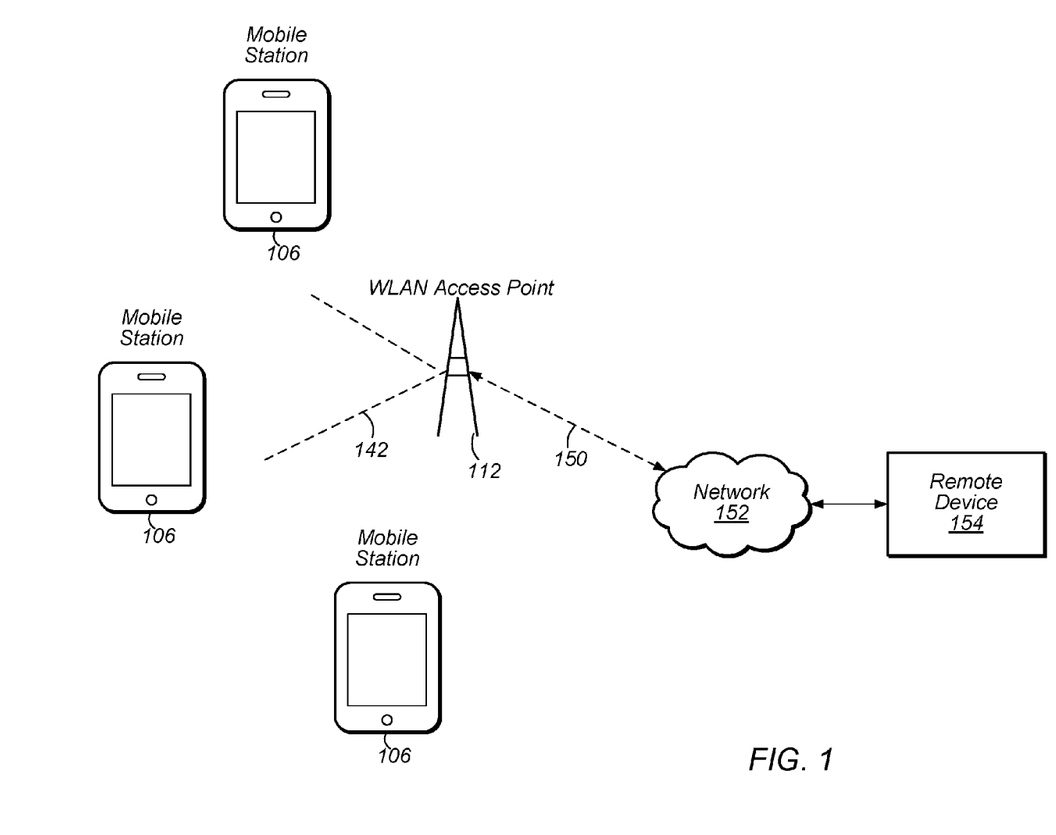
FIG. 1 illustrates an example WLAN communication system, according to some embodiments.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices, without use of the access point 112.

Further, in some embodiments, as further described below, a wireless device 106 may initialize a first threshold and transmit a frame transmission to another wireless device 106. If wireless device 106 determines that the frame transmission was successful, it may adjust the first threshold to a second threshold that is greater than the first threshold. Additionally or alternatively, if wireless device 106 determines that the frame transmission was not successful, the wireless device may adjust the first threshold to a third threshold that is less than the first threshold. The thresholds can be associated with any value or values, including carrier sensitivity and/or energy detection. Thus, the thresholds may be associated with the environment (carrier medium) surrounding wireless device 106, e.g., based on transmissions occurring between the plurality of wireless client stations 106 and/or between the plurality of wireless client stations 106 and AP 112 and/or any other form of wireless transmissions.

Figure 2:
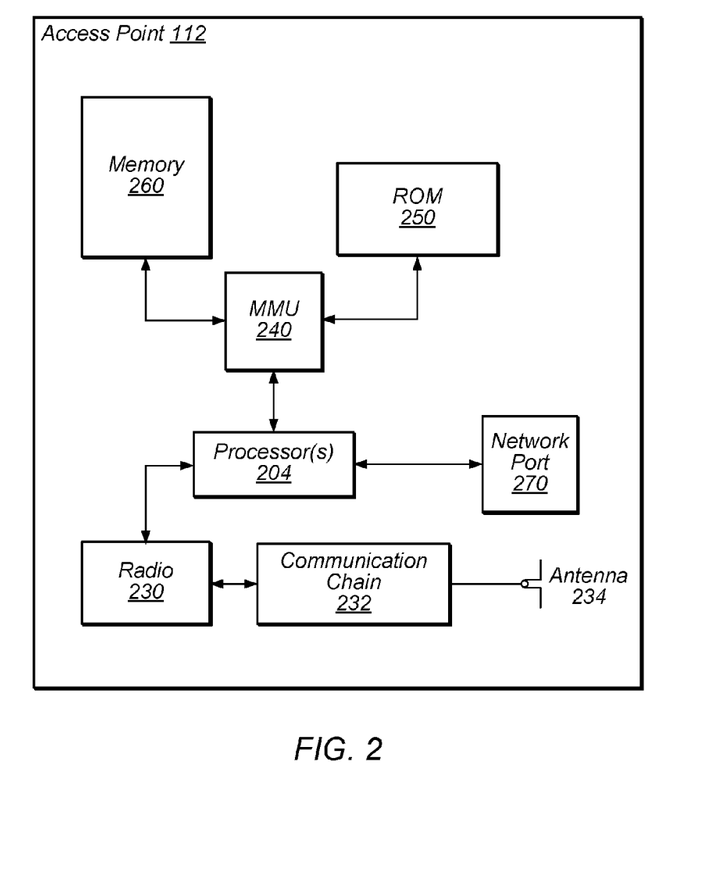
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

Further, in some embodiments, as further described below, a AP 112 may initialize a first threshold and transmit a frame transmission to a wireless device, such as one of the plurality of wireless devices 106 described above in reference to FIG. 1. If AP 112 determines that the frame transmission was successful, it may adjust the first threshold to a second threshold that is greater than the first threshold. Additionally or alternatively, if AP 112 determines that the frame transmission was not successful, AP 112 may adjust the first threshold to a third threshold that is less than the first threshold. The thresholds can be associated with any value or values, including carrier sensitivity and/or energy detection. Thus, the thresholds may be associated with the environment (carrier medium) surrounding AP 112, e.g., based on transmissions occurring between the plurality of wireless client stations 106 neighboring AP 112 and/or between the plurality of wireless client stations 106 and AP 112, and/or any other form of wireless transmissions.

Figure 3:
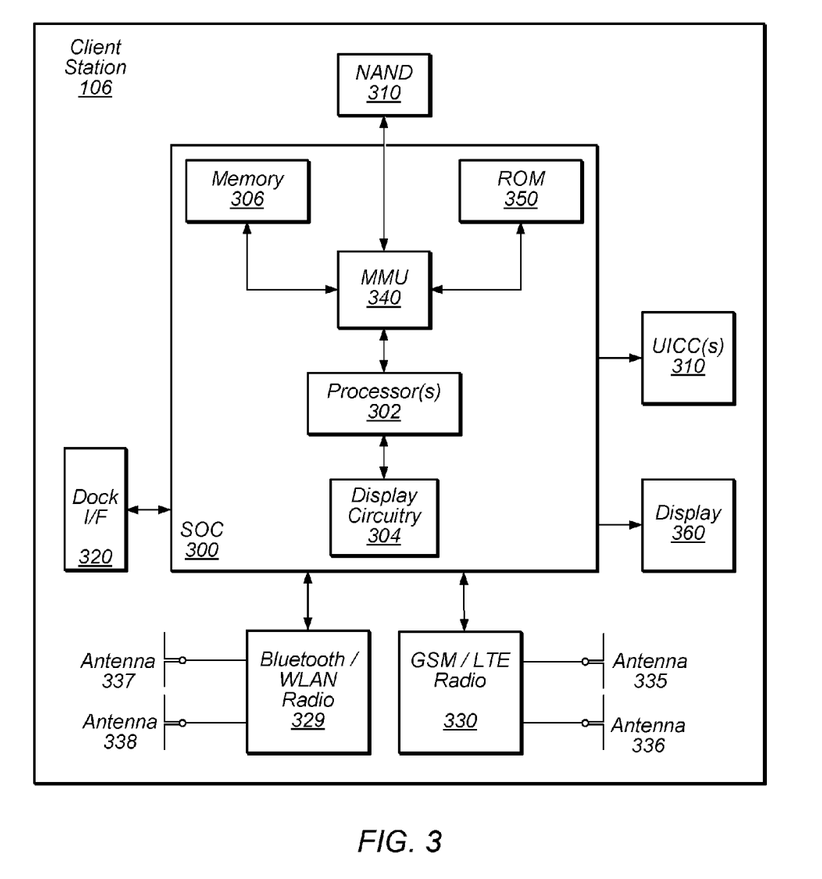
FIG. 3 illustrates an example simplified block diagram of a wireless station (UE), according to some embodiments.

FIG. 3—Client Station Block Diagram

FIG. 3 illustrates an example simplified block diagram of a client station 106. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may initialize a first threshold and transmit a frame transmission to a wireless device, such as one of the plurality of wireless devices 106 described above in reference to FIG. 1. If client station 106 determines that the frame transmission was successful, it may adjust the first threshold to a second threshold that is greater than the first threshold. Additionally or alternatively, if client station 106 determines that the frame transmission was not successful, client station 106 may adjust the first threshold to a third threshold that is less than the first threshold. The thresholds can be associated with any value or values, including carrier sensitivity and/or energy detection. Thus, the thresholds may be associated with the environment (carrier medium) surrounding client station 106.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Spatial Reuse and Network Capacity

Amendments to IEEE 802.11 have previously focused on improvement of spectral efficiency (bps/Hz) and development of protocols for efficient use of the spectrum in both frequency and time. However, the popularity and resulting increase in use of Wi-Fi based systems has led to more overlapping basic service sets (OBSS), where a basic service set (BSS) includes an access point (AP) and all stations (STAs) associated with the AP.

Overcrowding may occur in dense deployment environments, such as apartment buildings, shopping malls, restaurants, convention centers, and stadiums. For example, in an apartment building, there may be many set top boxes, each with built-in AP functionality, which can lead to overcrowding channels in both 2.4 GHz and 5 GHz. In addition, there may be unmanaged APs within close proximity of one another, as well as peer-to-peer applications within apartments (e.g., AirPlay, U-verse Wireless Receiver (HDTV), etc.). Thus, there may be a higher rate of collisions, and therefore, packet errors in such an environment.

As another example, in shopping malls, many storefronts may deploy private WLANs for business purposes (internal to the storefront) and public WLANs (for customer use). Additionally, the shopping mall may also provide a public WLAN for customer use. Thus, there may be a proliferation of OBSSs creating an environment of overcrowding resulting in higher rates of collisions, and therefore, higher packet errors.

Techniques have been presented for spatial reuse, including adjusting clear channel assessment (CCA) thresholds as defined in the IEEE 802.11 specification, dynamic sensitivity control (DSC), transmit power control (TPC), and BSS coloring.

Figure 4:
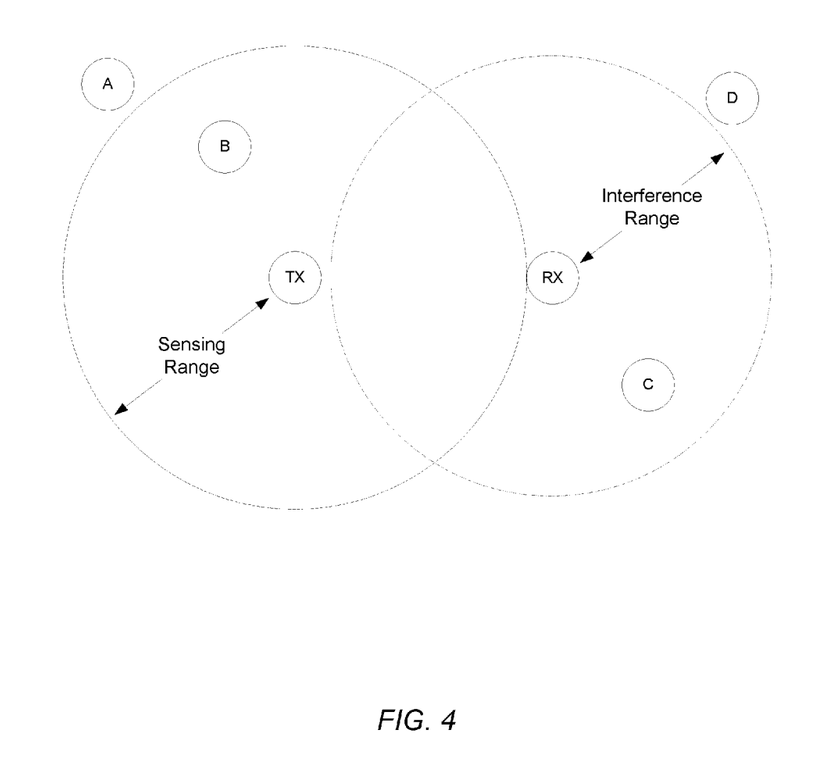
FIG. 4 illustrates an example scenario in which multiple wireless stations compete for medium access.

Spatial reuse may be affected by multiple factors including, but not limited to, sensing range, interference range, and received signal to interference plus noise ratio (SINR) or transmit (TX) power. For example, FIG. 4 illustrates a scenario in which multiple wireless stations compete for medium access. As shown in FIG. 4, a first wireless station (TX) may have a data packet (frame transmission) to send to a second wireless station (RX). TX may have a sensing range that includes RX and wireless station B. In addition, wireless station A may be in contention, along with wireless station B, for the medium within the sensing range of TX. Note that the sensing range may be based on the dynamic sensitivity control (DSC) of TX. Similarly, RX may have an interference range that includes TX and wireless station C. In addition, wireless station D, along with wireless station C, may be interference sources of RX. In other words, wireless stations C and D may interfere with signals destined for RX. Thus, in order for TX to transmit the data packet to RX, the transmission must contend for the medium with wireless stations A and B as well as overcome the interference caused by wireless stations C and D.

As this example illustrates, determining an effective combination of values of received SINR, sensing range (e.g., CCA thresholds), and interference range (e.g., TX power) is a non-trivial task. The optimal solution may depend on traffic models and node topology, as well as other parameters such as bandwidth, modulation and coding scheme (MCS), and a number of spatial streams (NSS), among other parameters. Additionally, node topology and applications may change over time, thus there may be no convergence to an optimal solution. In addition, performance may be impacted if parameter values are incorrectly specified.

Further, determining a solution to increase concurrent transmissions based on common channel bandwidth is non-trivial. Issues are present in 802.11ac with primary channels because the STA maintains only one EDCA back off counter on a primary channel.

Note that CCA may be determined either via energy detection (ED) or carrier sensing (CS, or preamble detection). CS refers to listening to a physical medium to detect ongoing transmission. ED refers to detection of noise in the transmission channel.

In some embodiments, as described herein, improved spatial reuse may allow for more concurrent reliable transmissions via management of interference in both enterprise and residential deployments while maintaining support for legacy devices (e.g., devices supporting IEEE 802.11g/n in the 2.4 GHz band and/or 802.11n/ac in the 5 GHz band). Thus, APs and STAs may both be located in a dense geographical area to maximize network capacity via each AP and/or STA adjusting its CCA (via ED or CS) thresholds to increase a number of concurrent transmissions.

Thus, in some embodiments, a device (either AP or STA), may adjust CCA-CS or CCA-ED to allow for additional concurrent transmissions. The adjustment may be based (or at least partially based) on implicit or explicit feedback from recipients. For example, implicit feedback may include determining packet error rate (PER) by counting acknowledgments (ACKs) or block acknowledgements (BA), or via received signal strength indicator (RSSI) of a reverse link. As another example, explicitly indicated feedback may include received SINR and/or recommended MCS at receiver sent back to the transmitter.

Figure 5A:
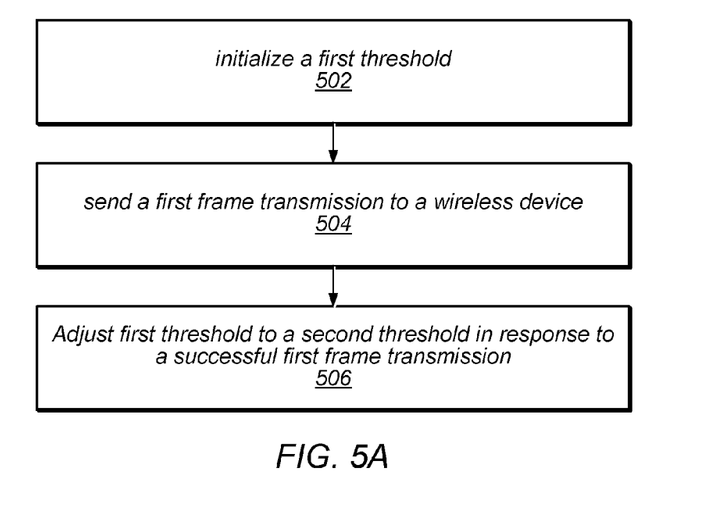
FIG. 5A illustrates an example method for a wireless device to improve spatial reuse, according to some embodiments.

FIG. 5A illustrates a method for a wireless device to improve spatial reuse, according to some embodiments. The method shown in FIG. 5A may be used in conjunction with any of the systems or devices shown in the above Figures, among other devices, as well as any of the methods described herein. In various embodiments, some of the method elements shown may be performed concurrently, in a different order than shown, or may be omitted. Additional method elements may also be performed as desired. As shown, this method may operate as follows.

At 502, a wireless device (either an AP, such as access point 112, or STA, such as wireless station 106) may initialize a first threshold. The first threshold may be based, at least partially, on a first specified parameter. In some embodiments the first threshold may be a CCA threshold, such as an ED or CS threshold. Additionally, the first specified parameter may be a low or minimum CS or ED threshold, such that an upper or maximum delay to access the medium may be preserved.

At 504, a first frame transmission may be sent to a wireless device, such as access point or wireless station. In some embodiments, the first frame transmission may be a data packet.

At 506, the first threshold may be adjusted to a second threshold in response to determining that the first frame transmission was successful. In other words, the first threshold may be adjusted (e.g., increased) to a second threshold. In some embodiments the second threshold may be the lower of (i) a sum of a weighted first threshold and a first offset, and (ii) a first specified parameter. The first specified parameter may be an upper or maximum CS or ED threshold, such that both devices involved in a transmission may 'hear' each other's transmission and a received SINR threshold can be satisfied for the lowest MCS supported for a link. A first weighting parameter may be used to weight the first threshold and may be at least partially based on node topology among other factors.

In some embodiments, if the frame transmission was not successful, the first threshold may be adjusted (e.g., decreased) to a third threshold. In some embodiments the third threshold may be the higher of (i) a difference of a weighted first threshold and a second offset, and (ii) a second specified parameter. The second specified parameter may be a lower or minimum CS or ED threshold. A second weighting parameter may be used to weight the first threshold and may be at least partially based on node topology among other factors.

In some embodiments, the adjustment of the first threshold may be a linear-increase/linear-decrease adjustment. Thus, the first and second weighting parameters may be set to 1, and the first and second offsets may each be greater than zero.

In some embodiments, the adjustment of the first threshold may be a linear-increase/multiplicative-decrease adjustment. Thus, the first weighting parameter may be set to 1, whereas the second weighting parameter may be a number less than 1. Additionally, the first offset may be greater than zero and the second offset may be set to zero.

In some embodiments, the adjustment of the first threshold may be a multiplicative-increase/multiplicative-decrease adjustment. Thus, the first weighting parameter may be a number greater than 1 and the second weighting parameter may be a number less than 1. Additionally, the first and second offsets may each be set to zero.

In some embodiments, the adjustment of the first threshold may be a multiplicative-increase/linear-decrease. Thus, the first weighting parameter may be a number greater than 1 and the second weighting parameter may be set to 1. Additionally, the first offset may be set to zero and the second offset may be a number greater than zero.

In further embodiments, each device (AP or STA) may adjust its own first threshold. In other words, each device in a BSS adjusts thresholds independent of other devices in the BSS. This may eliminate need for a central management entity and may allow for improved adaptation to varying node topologies and traffic loads near the device.

It should be noted that BSS coloring may be used with any of the above described embodiments. Further, hidden nodes within the same BSS may be protected since each device in the BSS adjusts thresholds independently.

Figure 5B:
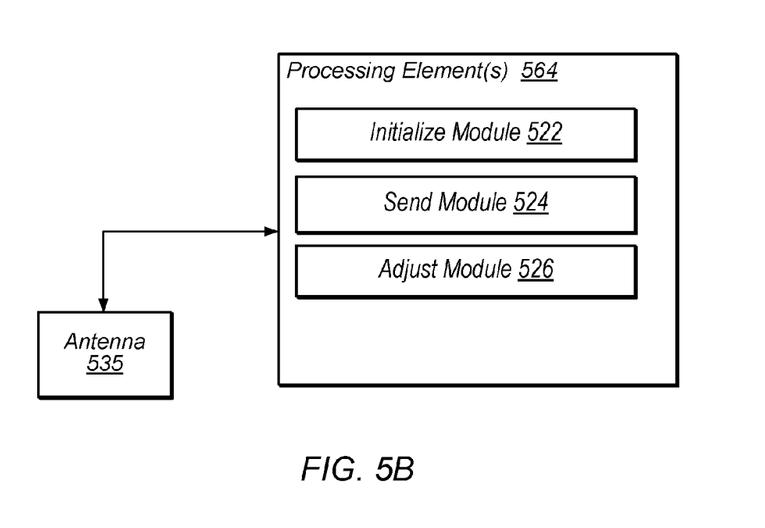
FIG. 5B illustrates an example processing element including modules for registering and publishing services on behalf of a wireless device, according to some embodiments.

FIG. 5B illustrates a processing element including modules for registering and publishing services on behalf of a wireless device, according to some embodiments. In some embodiments, antenna 535 may be coupled to processing element 564. The processing element may be configured to perform the method described above in reference to FIG. 5A. In some embodiments, processing element 564 may include one or more modules, such as modules (or circuitry) 522-526, and the modules (or circuitry) may be configured to perform various steps of the method described above in reference to FIG. 5A. In some embodiments, the processing element may be included in a wireless device, such as wireless station 106. In other embodiments, the processing element may be included in a radio module of a wireless device, such as wireless station 106. In other words, the processing element may be a baseband processor and may be coupled to one or more antennas of a wireless device or one or more receive and/or transmit chains of a wireless device. As shown, the modules may be configured as follows.

In some embodiments, processing element 564 may include an initialize module 522 configured to initialize a first threshold. The first threshold may be based, at least partially, on a first specified parameter. In some embodiments the first threshold may be a CCA threshold, such as an ED or CS threshold. Additionally, the first specified parameter may be a low or minimum CS or ED threshold, such that an upper or maximum delay to access the medium may be preserved.

In some embodiments, processing element 564 may include a send module 524 configured to send a first frame transmission to a wireless device, such as access point or wireless station. In some embodiments, the first frame transmission may be a data packet.

In some embodiments, processing element 564 may include a publish module 526 configured to adjust the first threshold to a second threshold in response to determining that the first frame transmission was successful. In other words, the first threshold may be adjusted (e.g., increased) to a second threshold. In some embodiments the second threshold may be the lower of (i) a sum of a weighted first threshold and a first offset, and (ii) a second specified parameter. The second specified parameter may be an upper or maximum CS or ED threshold, such that both devices involved in a transmission may 'hear' each other's transmission and a received SINR threshold can be satisfied for the lowest MCS supported for a link. A first weighting parameter may be used to weight the first threshold and may be based on node topology among other factors.

In some embodiments, if the frame transmission was not successful, the first threshold may be adjusted (e.g., decreased) to a third threshold. In some embodiments the third threshold may be the higher of (i) a difference of a weighted first threshold and a second offset, and (ii) the second specified parameter. A second weighting parameter may be used to weight the first threshold and may be at least partially based on node topology among other factors.

It is apparent for those skilled in the art that, for the particular processes of the modules (or circuitry) described above (such as modules 522, 524, and 526), reference may be made to the corresponding steps (such as steps 502, 504, and 506, respectively) in the related process embodiment sharing the same concept and the reference is regarded as the disclosure of the related modules (or circuitry) as well. Furthermore, processing element 564 may be implemented in software, hardware or combination thereof. More specifically, processing element 564 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 564 may be implemented as a general-purpose processor such as a CPU, and therefore each module can be implemented with the CPU executing instructions stored in a memory which perform a respective step.

Figure 6A:
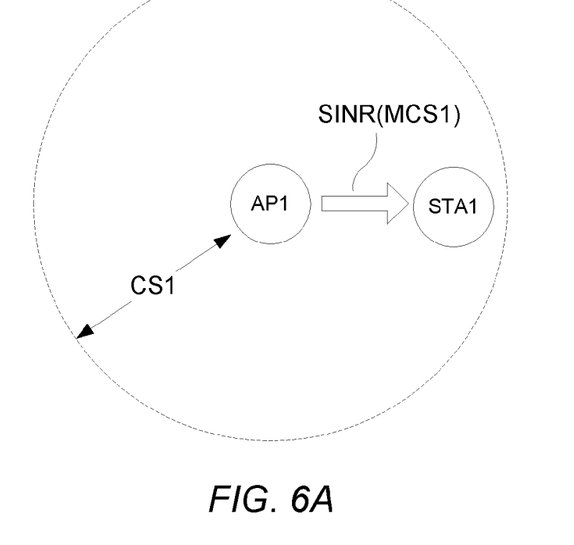
FIG. 6A illustrates an example of a first wireless device attempting transmission to a second wireless device where the first wireless device has a first channel sensing threshold, according to some embodiments.
Figure 6B:
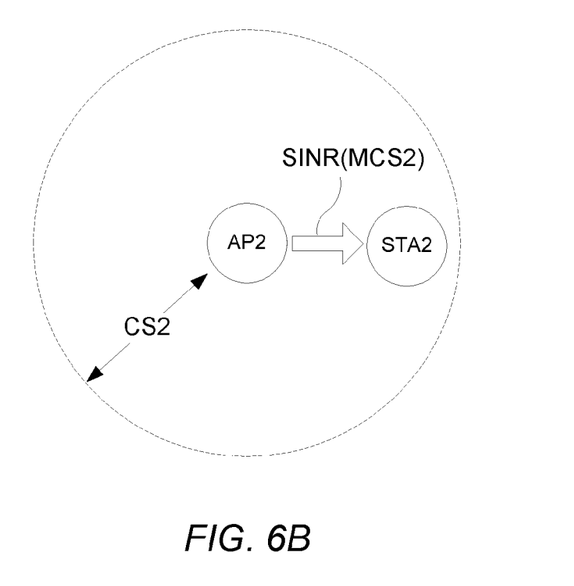
FIG. 6B illustrates another example a first wireless device attempting transmission to a second wireless device where the first wireless device has a first channel sensing threshold, according to some embodiments.

FIGS. 6A-6B illustrate examples of the above described embodiments. For example, FIG. 6A illustrates an example of a first wireless device attempting transmission to a second wireless device where the first wireless device has a first channel sensing threshold, according to embodiments. As shown, the first wireless device (AP1) attempts to send a frame transmission (data packet) to a second wireless device (STA1). AP1 may have a channel sensing (CS) threshold of CS1 and the frame transmission may have an SINR based on MCS1. According to embodiments, if the frame transmission fails, CS1 may be decreased (e.g., to Y(dB)) which results in an increase in CS sensitivity (e.g., an increase in coverage).

FIG. 6B illustrates another example a first wireless device attempting transmission to a second wireless device where the first wireless device has a first channel sensing threshold, according to embodiments. As shown, the first wireless device (STA2) attempts to send a frame transmission to the second wireless device (AP2). STA2 may have a CS threshold of CS2 and the frame transmission may have an SINR based on MCS2. If the frame transmission succeeds, CS2 may be increased (e.g., to X(dB)) which results in a decreased CS sensitivity (e.g., a decrease in coverage).

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
at least one antenna;
at least one radio communicatively coupled to the antenna and configured to perform wireless communication within a wireless network;
at least one processor communicatively coupled to the at least one radio, wherein the wireless device is configured to perform voice and/or data communications;
wherein the at least one processor is configured to:
initialize a first threshold;
transmit a first frame to an other wireless device; and
adjust, in response to determining that the first frame was successfully received by the other wireless device, the first threshold to a second threshold corresponding to a lower of:
a sum of a first weighted first threshold and a first offset: or
a first specified parameter;
wherein the second threshold is greater than the first threshold, and wherein adjustment of the first threshold to the second threshold increases a number of concurrent transmissions that can be performed within the wireless network.

2. The wireless device of claim 1,
wherein the at least one processor is further configured to:
adjust, in response to determining that the first frame was not successfully received by the other wireless device, the first threshold to a third threshold, wherein the third threshold is lower than the first threshold.

3. The wireless device of claim 2,
wherein the third threshold corresponds to the greater of:
a difference between a second weighted first threshold and second offset; or
a second specified parameter.

4. The wireless device of claim 1,
wherein the first threshold comprises at least one of a carrier sensitivity threshold and an energy detection threshold; and
wherein the second threshold comprises at least one of a carrier sensitivity threshold and an energy detection threshold.

5. The wireless device of claim 1,
wherein the adjustment is at least partially based on at least one of implicit feedback and explicit feedback;
wherein the implicit feedback comprises at least one of determined packet error rate or received signal strength indicator (RSSI); and
wherein the explicit feedback comprises at least one of received signal to interference plus noise ratio (SINR) or received recommended modulation and coding scheme (MCS).

6. The wireless device of claim 1,
wherein the adjustment comprises one of:
a linear increase linear decrease adjustment;
a linear increase multiplicative decrease adjustment;
a multiplicative increase multiplicative decrease adjustment; or
a multiplicative increase linear decrease adjustment.

7. An apparatus, comprising:
a memory; and
at least one processor in communication with the memory, wherein the at least one processor is configured to:
initialize a first threshold;
generate instructions to transmit a frame to another wireless device within a basic service set (BSS); and
in response to determining that the frame transmission was successful, adjust the first threshold to a second threshold, wherein the second threshold is greater than the first threshold, wherein adjustment of the first threshold utilizes a first weighting parameter at least partially based on a node topology of the BSS, and wherein the second threshold corresponds to a lower of:
a sum of a first offset and a product of the first threshold and the first weighting parameter; or
a first specified parameter.

8. The apparatus of claim 7,
wherein the at least one processor is further configured to:
adjust, in response to determining that the frame transmission was not successful, the first threshold to a third threshold, wherein the third threshold is less than the first threshold, and wherein adjustment of the first threshold utilizes a second weighting parameter at least partially based on the node topology of the BSS.

9. The apparatus of claim 8,
wherein the third threshold corresponds to the greater of:
a difference of a second offset and a product of the first threshold and the second weighting parameter; or
a second specified parameter.

10. The apparatus of claim 7,
wherein the first threshold comprises at least one of a carrier sensitivity threshold and an energy detection threshold;
wherein the second threshold comprises at least one of a carrier sensitivity threshold and an energy detection threshold.

11. The apparatus of claim 7,
wherein the adjustment is at least partially based on at least one of implicit feedback and explicit feedback;
wherein the implicit feedback comprises at least one of determined packet error rate or received signal strength indicator (RSSI); and
wherein the explicit feedback comprises at least one of received signal to interference plus noise ratio (SINR) or received recommended modulation and coding scheme (MCS).

12. The apparatus of claim 7,
wherein the adjustment comprises one of:
a linear increase linear decrease adjustment;
a linear increase multiplicative decrease adjustment;
a multiplicative increase multiplicative decrease adjustment; or
a multiplicative increase linear decrease adjustment.

13. A non-transitory computer readable memory medium storing program instructions executable by a processor to:
generate instructions to transmit a frame to another wireless device within a basic service set (BSS); and
in response to determining that the frame transmission was successful, adjust a threshold to a lower of:
a sum of a first offset and a product of the threshold and a first weighting parameter; or
a first specified parameter.

14. The non-transitory computer readable memory medium of claim 13,
wherein, in response to determining that the frame transmission was not successful, the program instructions are further executable to adjust the threshold to the greater of:
a difference of a second offset and a product of the first threshold and a second weighting parameter; or
a second specified parameter.

15. The non-transitory computer readable memory medium of claim 13,
wherein the first weighting parameter is at least partially based on a node topology of the BSS.

16. The non-transitory computer readable memory medium of claim 13,
wherein the threshold comprises at least one of a carrier sensitivity threshold or an energy detection threshold.

17. The non-transitory computer readable memory medium of claim 13,
wherein the adjustment is at least partially based on at least one of implicit feedback and explicit feedback;
wherein the implicit feedback comprises at least one of determined packet error rate or received signal strength indicator (RSSI); and
wherein the explicit feedback comprises at least one of received signal to interference plus noise ratio (SINR) or received recommended modulation and coding scheme (MCS).

18. The non-transitory computer readable memory medium of claim 13,
wherein the adjustment comprises one of:
a linear increase linear decrease adjustment;
a linear increase multiplicative decrease adjustment;
a multiplicative increase multiplicative decrease adjustment; or
a multiplicative increase linear decrease adjustment.

19. The wireless device of claim 1,
wherein the first weighted first threshold is at least partially based on a node topology of a basic service set (BSS).

20. The non-transitory computer readable memory medium of claim 13,
wherein the first weighting parameter is at least partially based on a node topology of the BSS.

* * * * *